US009244807B2

United States Patent
Dobbelstein et al.

(10) Patent No.: US 9,244,807 B2
(45) Date of Patent: Jan. 26, 2016

(54) QUASI DISK DRIVE FOR TESTING DISK INTERFACE PERFORMANCE

(75) Inventors: Steven L. Dobbelstein, Austin, TX (US); Steven L. Pratt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/168,778

(22) Filed: Jun. 24, 2011

(65) Prior Publication Data

US 2012/0331344 A1    Dec. 27, 2012

(51) Int. Cl.
*G06F 11/34* (2006.01)

(52) U.S. Cl.
CPC ........ *G06F 11/3485* (2013.01); *G06F 11/3419* (2013.01)

(58) Field of Classification Search
CPC ............ G06F 11/3409; G06F 11/3457; G06F 11/3466; G06F 11/3485; G06F 11/28; G06F 11/349; G06F 11/3495; G06F 11/345; G06F 11/3419
See application file for complete search history.

(56) References Cited

U.S. PATENT DOCUMENTS

| | | | |
|---|---|---|---|
| 5,357,519 A * | 10/1994 | Martin et al. | 714/25 |
| 5,663,851 A | 9/1997 | Jeong et al. | |
| 6,920,416 B1 * | 7/2005 | Swoboda et al. | 703/13 |
| 2004/0078185 A1 | 4/2004 | Briggs et al. | |
| 2004/0193785 A1 | 9/2004 | Zayas et al. | |
| 2006/0023594 A1 | 2/2006 | Sogawa et al. | |
| 2008/0074107 A1 | 3/2008 | Fan et al. | |
| 2009/0281782 A1 * | 11/2009 | Bitar et al. | 703/21 |

OTHER PUBLICATIONS

J.D. Meier et al, Microsoft patterns and practices, How to Conduct Performance Testing, Jun. 26, 2010.*
James McCaffrey, Configuration Testing With Virtual Server Part 1, Sep. 2008.*
James McCaffrey et al., Configuration Testing With Virtual Server Part 2, Dec. 2008.*
Network Test Inc., Network Computing Lab Test Bandwidth Managers, Jun. 12, 2000.*
Griffin et al., Timing-accurate Storage Emulation, Proceedings of the Conference on File and Storage Technologies (FAST) Jan. 28-30, 2002.*

* cited by examiner

Primary Examiner — Mischita Henson
Assistant Examiner — Kyle R Quigley
(74) Attorney, Agent, or Firm — Lieberman & Brandsdorfer, LLC (57) ABSTRACT

Embodiments of the invention relate to diagnostic evaluation of hardware components of a computer machine. A conventional storage device is replaced with a modified storage device. Read and write operations are received by the modified storage device. Issuance of a response to the read and write operations is limited to an acknowledgement receipt, which is employed to evaluate performance and/or bandwidth of the machines with respect to hardware for data storage.

15 Claims, 8 Drawing Sheets

QUASI DISK DRIVE FOR TESTING DISK INTERFACE PERFORMANCE

BACKGROUND

1. Technical Field

The present invention relates to a method and system for testing performance of hardware elements in a computer system. More specifically, the invention relates to a system and method that tests performance of hardware elements within the computer system.

2. Description of the Prior Art

Access to disk storage systems, or storage media, is necessary to support both read and write operations in a computer system. Different factors are employed for assessment of performance of the computer, including throughput, e.g. megabytes per second, and I/O operations per second. However, it is recognized in the art that performance is a difficult measurement to attain. More specifically, performance may be based upon the software or hardware, or on a combination of the hardware and software. Accordingly, there may be an issue with compatibility associated with the combination of the hardware and software that affects performance measurement.

With respect to the computer hardware assessing associated performance, there is an issue of a direct assessment. More specifically, hardware is generally not a single element within the system, but is in communication with adapters, controllers, etc. To assess performance of a select hardware element, this element needs to have some form of isolation or direct communication with an assessment tool. Otherwise, the performance being assessed cannot be directly correlated with a single computer hardware element.

SUMMARY OF THE INVENTION

This invention comprises a method, system, and apparatus for hardware testing and evaluation.

In one aspect of the invention, a method is provided for hardware performance evaluation in a computer system. More specifically, a hardware element is provided in communication with an operating system. The hardware element includes logic to emulate the behavior of a persistent storage device. In addition, the hardware element includes a connector to provide a direction connection of the hardware element to a storage slot. A request is sent from an application to the hardware element, with processing of the request requiring access to the hardware element. In response to receipt of the request, the hardware element issues a response without processing data to support the request. Performance of supporting hardware in communication with the hardware element is tested. More specifically, the performance measures a measurable factor associated with both sending of the request and receipt of a response.

In another aspect, a system is provided with a processing unit in communication with both memory and an operating system, and a hardware element in communication with the operating system. The hardware element includes logic to emulate behavior of a persistent storage device, and a connector to attach directly into a storage slot. A functional unit is provided in communication with the memory and includes a diagnostic program in communication with managers. More specifically, the diagnostic program supports issuance of an evaluation to the hardware element. A request manager in communication with the diagnostic program sends a request from the diagnostic program to the hardware element. The request manager accesses the hardware element and receives a response to the request from the hardware element, without the hardware element processing data to support the request. A test manager in communication with the request manager tests performance of supporting hardware in communication with the hardware element. More specifically, the test manager measures a factor associated with both the send of the request and receipt of a response.

In yet another aspect, a computer program product is provided for use with an electronic communication. The computer program product includes a computer-readable storage medium having computer readable program code embodied thereon, which when executed causes a computer to implement a method for testing performance of computer hardware. More specifically, the computer program product configures a hardware element with logic to emulate behavior of a persistent storage device, and a connector to secure directly to a storage slot. The computer program product sends a request to the hardware element, including instructions to access the hardware element. In addition, the computer program product supports the hardware element responding to the request without actually supporting the request. The computer program product tests performance of supporting hardware in communication with the hardware element in an effort to measure a measureable factor associated with sending the request and receiving a response to the request.

In an even further aspect, a computer implemented method is provided for evaluation of hardware components. More specifically, a hardware element is provided in communication with an operating system, with the hardware element configured with a connector to secure directly to a hard drive slot and logic to emulate behavior of a persistent storage device. An application issues a request to the hardware element, with the request accessing the embedded logic. A diagnostic tool receives response communication(s) from the embedded logic. More specifically, the response communication(s) includes an acknowledgement of receipt of the request without data to support the request. Performance of supporting hardware is tested by measuring a factor associated with sending of the request and receipt of a response.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as tools, modules, and/or managers. The functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

It is recognized in the art that a disk drive is employed to store data. A read operation reads data from the data storage, i.e. disk drive, and a write operation changes data or takes data stored elsewhere and stores the changed data on the disk drive. To test performance of the computer system that communicates with the disk drive, a device and associated assessment tool is provided to emulate a disk drive, referred to herein as a modified storage device. One critical factor is that the modified storage device does not store data. In fact, the modified storage device is configured to respond to received disk drive protocols commands, e.g. read and write operations. The assessment tool is concerned with response speed with the modified storage device and not with data consistency or storage.

Figure 1:
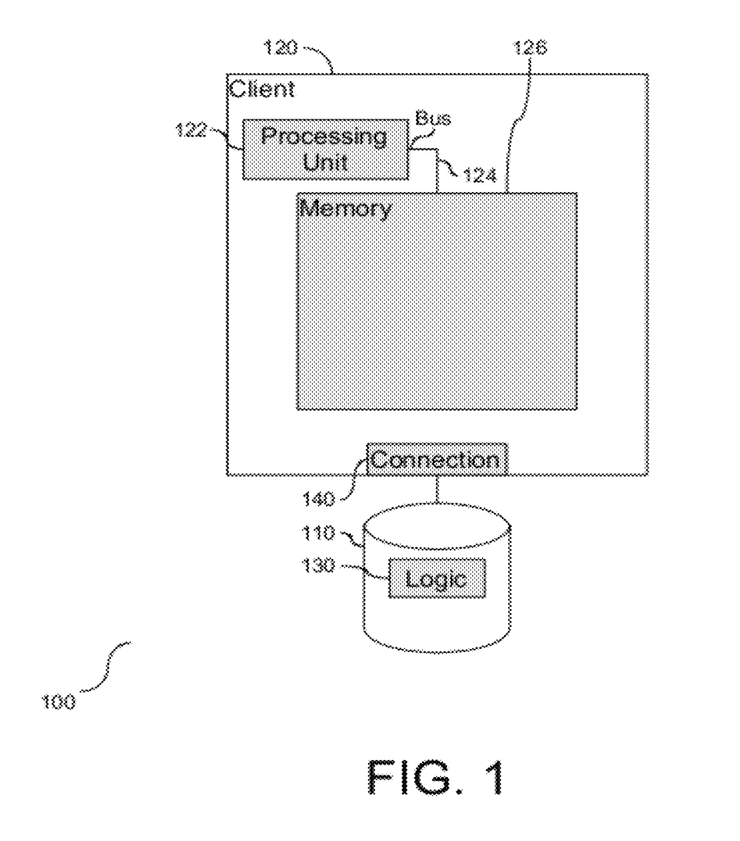
FIG. 1 is a block diagram illustrating a modified storage device in communication with a client machine.

FIG. 1 is a block diagram (100) illustrating a modified storage device in communication with a client machine. As shown, a modified storage device (110) is provided in communication with a client machine (120). The client machine (120) is a conventional client machine with a processing unit (122) in communication with memory (126) across a bus (124). Read and write operations are issued by the processing unit (122) and communicated to the modified storage device (110). With respect to the modified storage device (110) and its hardware connection (140) to the client machine (120), the modified storage device (110) plugs into the client machine (120) via a direct port connection and in the same manner as a conventional storage device. More specifically, the connection of the modified storage device (110) to the client machine (120) is absent a cable or any other intermediate hardware element. Accordingly, the connection of the modified storage device (110) to the client machine (120) is a direct connection that parallels connection of a conventional storage device to the client machine.

To address processing of read and write operations, the modified storage device (110) has exterior characteristics of a conventional disk drive. However, modifications are made to the internal functionality of the device. More specifically, logic is provided to make the modified storage device (110) look and feel like a conventional disk drive. As shown, logic (130) is provided in communication with the processing unit (122). The logic (130) emulates storage device behavior so that from a hardware perspective the modified storage device (110) is a conventional storage device, and from a software perspective a diagnostic application can differentiate the modified storage device (110) from an actual storage device, as will be explained in detail with reference to the diagnostic application(s). In one embodiment, the logic (130) emulates a hard disk drive, including sectors and tracks. However, the logic (130) associated with the modified storage device (110) is not a hard disk drive, it does not spin and in one embodiment, the logic (130) is not affected by delays associated with spinning a disk. Similarly, in one embodiment, the logic (130) is located on a semi-conductor local to the modified storage device (110). Accordingly, the modified storage device (110) is configured with logic to provide the characteristics and appearance of a conventional hard disk, in a manner to support diagnostic testing of communication with the storage device.

Figure 2:
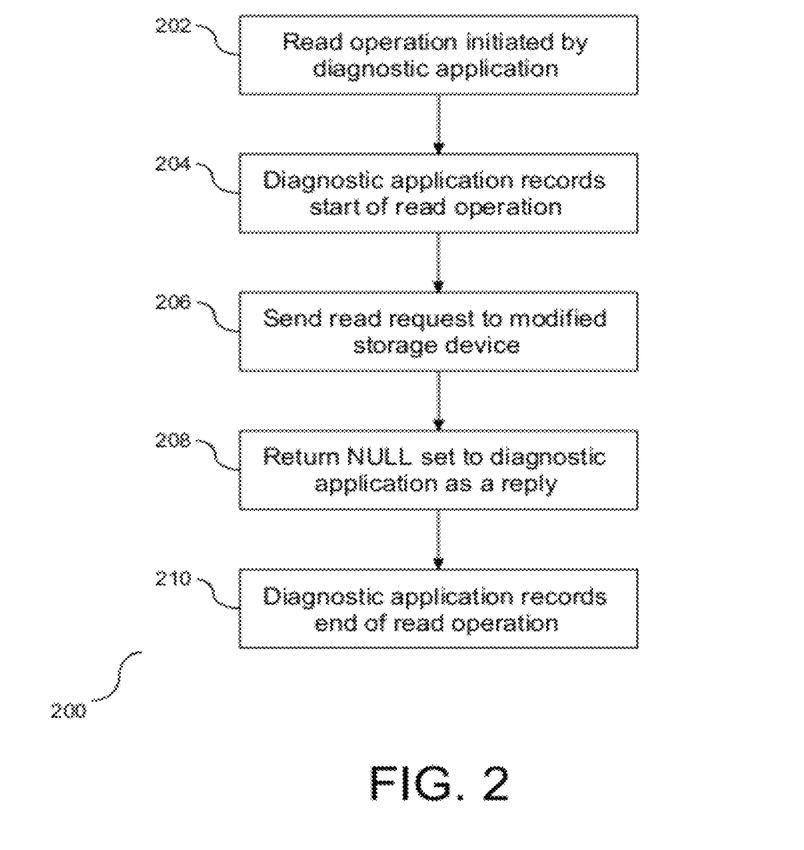
FIG. 2 is a flow chart illustrating diagnostic testing of performance with respect to a read operation.

As described herein, testing is conducted on the modified storage device (110) to ascertain performance or performance deficiencies with respect to a conventional storage device in communication with the client machine. FIG. 2 is a flow chart (200) illustrating diagnostic testing of performance with respect to a read operation. As shown, a read operation is initiated by a diagnostic application (202). The read operation is not an actual read operation, as the diagnostic application is not concerned with actual data. Rather, the read operation merely communicates with the modified storage device in the form of a read operation. Following step (202), the diagnostic application records the start of the read operation (204). There are different tools employed for tracking a time interval, including but not limited to, starting a time, reading a clock, etc. Recording the start of the read operation includes the start of tracking the time interval. Following step (204), the read request associated with the read operation is sent to the modified storage device (206). As the modified storage device is not a hard disk, a NULL data set is returned to the diagnostic application as a reply to the read operation (208), and the diagnostic application records the end of the read operation (210). In one embodiment, a time interval, better described as the difference between the start interval and end of the read operation, is calculated and referred to as the measured element. Similarly, in one embodiment, the read operation originates from an application local to the client machine or from a server in communication with the client machine over a network connection. Accordingly, the time for processing a read operation is ascertained in conjunction with the modified storage device.

Figure 3:
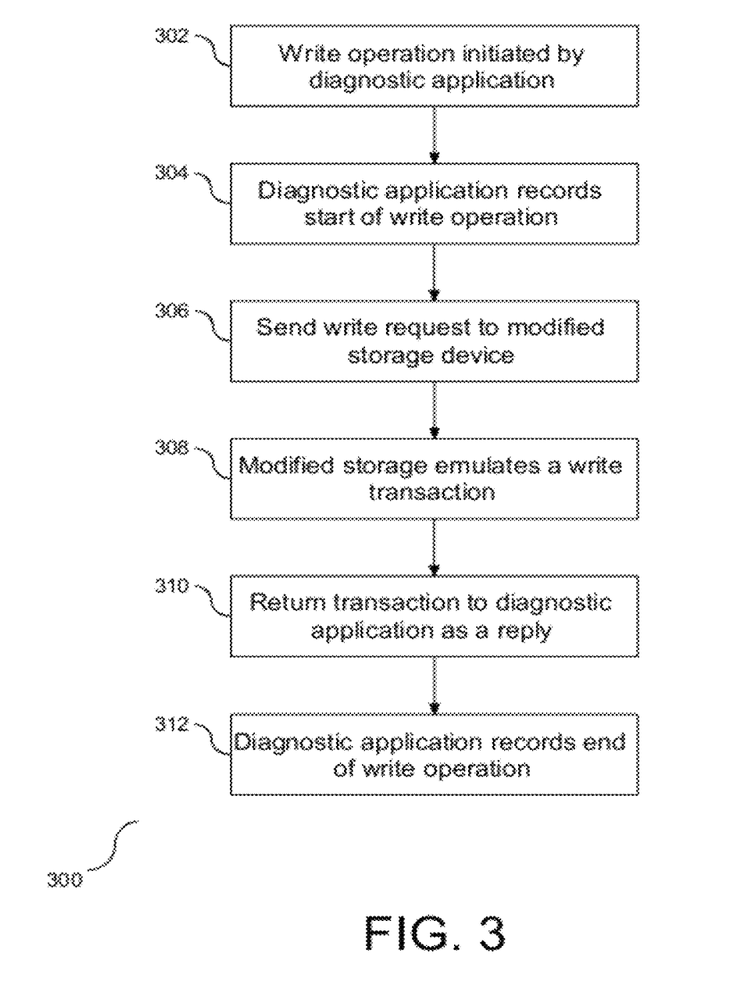
FIG. 3 is a flow chart illustrating diagnostic testing of performance with respect to a write operation.

A write operation may be emulated in a similar manner to the read operation shown in FIG. 2. More specifically, FIG. 3 is a flow chart (300) illustrating diagnostic testing of performance with respect to a write operation. As shown, a write operation is initiated by a diagnostic application (302). The write operation is not an actual write operation, as the diagnostic application is not concerned with actual data. Rather, the write operation merely communicates with the modified storage device in the form of a write transaction. Following step (302), the diagnostic application records the start of the write operation (304). There are different tools employed for tracking a time interval, including but not limited to, starting a time, reading a clock, etc. Recording the start of the write operation includes the start of tracking the time interval. Following step (304), the write request associated with the write operation is sent to the modified storage device (306). Although the modified storage device in receipt of the request is not a hard disk, the transaction accesses the modified storage device to emulate a write transaction (308). When the actions of the write transaction are completed and the transaction is returned to the diagnostic application as a reply to the write operation (310), the diagnostic application records the end of the write operation (312). In one embodiment, a time interval as the difference between the start interval and end of the write operation is calculated and referred to as the measured element. Similarly, in one embodiment, the write operation originates from an application local to the client machine or from a server in communication with the client machine over a network connection. Accordingly, the time for processing a write operation is ascertained in conjunction with the modified storage device.

Figure 4:
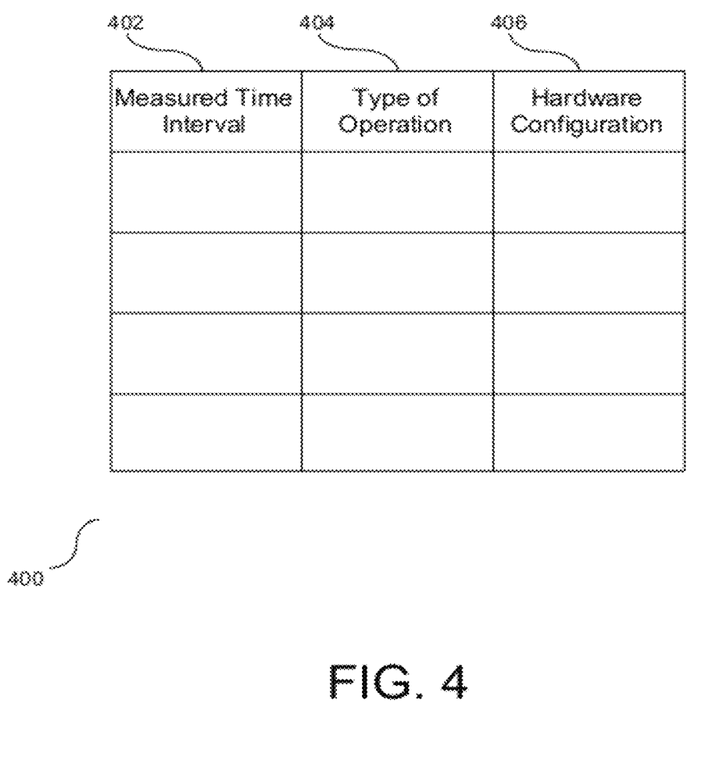
FIG. 4 is a block diagram illustrating one form of a data structure.

The read and write operations demonstrated in FIGS. 2 and 3, respectively, pertain to a direct communication of an operation to a modified storage device emulating a hard disk device. The time interval measured in both scenarios is employed to address the speed of request processing. More specifically, the measurement is employed to determine the source of any delays. In one embodiment, a table is maintained to store the measured time interval together with the hardware configurations and identification of the operation. FIG. 4 is a block diagram (400) illustrating one form of a data structure. More specifically, three categories of data are organized in the data structure, including the measured time interval (402), the type of operation (404) (e.g. read or write operation), and the hardware configuration (406). It is understood that the relevance of the measured time interval is with respect to the hardware configuration. In one embodiment, different hardware configurations may provide different measurements of time, and as such yield different performance measurement. Accordingly, the measured data is organized and stored in a data structure.

Figure 5:
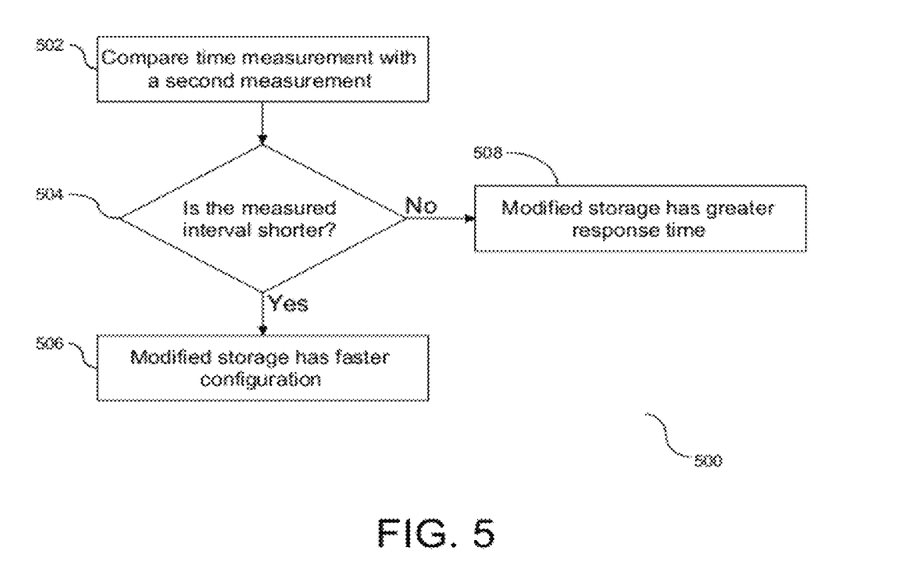
FIG. 5 is a flow chart illustrating a process of analyzing the read and write operation measurement data.

Following measurement of data shown in FIGS. 2 and 3 and/or accumulated in FIG. 4, the data is analyzed. FIG. 5 is a flow chart (500) illustrating a process of analyzing the read and write operation measurement data. As may be understood, the data in its raw form is a time measurement for completion of a transaction without actually completing the transaction. This time measurement is used as a basis for comparison with other product and configurations of hardware. At least one time measurement is acquired, as shown in FIGS. 2 and 3, and this measurement is compared with a second measurement of a comparable process (502). In one embodiment, the comparison may be with competitor data. Similarly, in one embodiment, the comparison may be with an alternative hardware configuration. In one aspect, it is desirable for the measured time interval to be short without jeopardizing performance. A short time measurement provides a faster time for processing the read and/or write operation.

As such, following the comparison at step (502), it is determined if the measured time interval is shorter than the comparison time interval (504). A positive response to the determination at step (504) is an indication that the hardware supporting the modified storage device with the embedded logic has a faster hardware configuration than the hardware configuration supporting the comparison data (506). Conversely, a negative response to the determination at step (504) is an indication that the hardware supporting the modified storage device with the embedded logic has a greater response time than the hardware configuration supporting the comparison data (508). In one embodiment, the comparison at step (502) may be reversed. However, regardless of the actual comparison test, the comparison ascertains which hardware configuration has a greater latency. Accordingly, the measured time intervals and evaluation of the interval data provides performance data with respect to delayed data processing.

Figure 6:
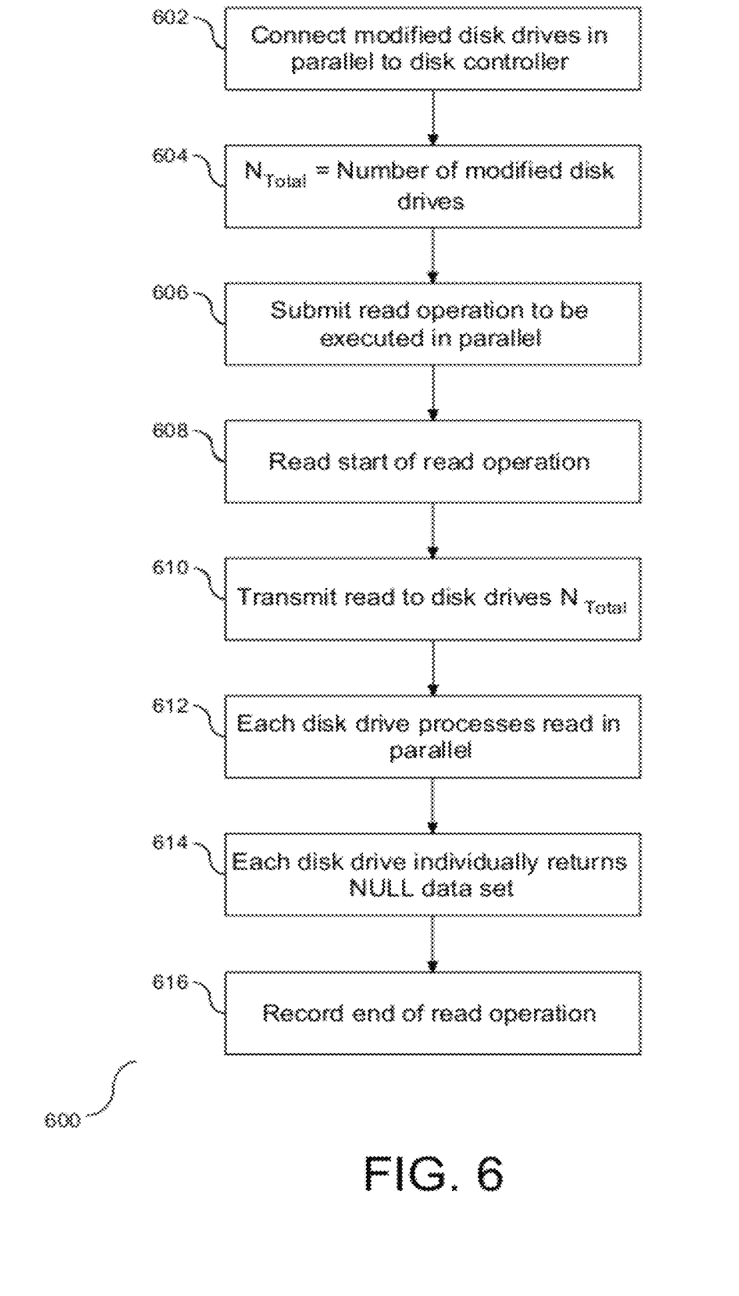
FIG. 6 is a flow chart illustrating a process for measuring bandwidth, and more specifically capacity of the hardware to support parallel operations.

The evaluation of read and write operations are not limited to measurement of time and associated latency. The modified disk drive may be employed to evaluate different metrics within the hardware configuration. FIG. 6 is a flow chart (600) illustrating a process for measuring bandwidth, and more specifically capacity of the hardware to support parallel operations. A plurality of modified disk drives is connected in parallel to a disk controller (602). The quantity of connected modified disk drives is set to the variable $N_{Total}$ (604). A read operation is submitted to each of the modified disk drives in a single communication, with the communication indicating that the requests should run in parallel (606). Before transmission of the read operation, a diagnostic application records the start of the read operation (608). There are different tools employed for tracking a time interval, including but not limited to, starting a time, reading a clock, etc. Recording the start of the read operation includes the start of tracking the time interval. Following step (608), the read operations are transmitted to all of the modified disk drives represented by the variable $N_{Total}$ (610). Each of the individual modified disk drives process the operation in parallel (612) and individually returns a NULL data set to the diagnostic application as a reply to the read operation (614). Following receipt of the NULL data set, the diagnostic application records the end of the read operation (616). Accordingly, the time for processing parallel read operation is ascertained in conjunction with the quantity of modified storage devices in communication with the controller.

Evaluation of bandwidth, as shown in FIG. 6, supports determining how many requests can be processed in parallel, and more specifically, how much bandwidth an associated fibre channel can support. The measured time interval is a characteristic of bandwidth capacity. In one embodiment, the measured time interval can be evaluated, per the process shown in FIG. 5. Based upon the evaluation, the quantity of modified hard drives can be increased or decreased to test for critical mass of the bandwidth. Although FIG. 6 demonstrates evaluation of bandwidth for a read operation, it may be similarly employed for evaluation of parallel processing of a write operation based upon the premise of FIGS. 3 and 6.

The modified disk drive employed in evaluation of read and write operations may emulate a disk drive that requires a spinning of the disk to support read and write operations. However, in one embodiment the logic of the modified disk drive may be configured to emulate a disk drive that does not require spinning of a disk, such as flash memory. By configuring the logic of the modified hard drive, the data gathered and evaluated is indicative of performance of hardware that communicates with storage media to support read and write operations. Hardware components include, but are not limited to, an adapter, a fibre channel, a disk controller, etc. Similarly, the data gathered and evaluated may be indicative of performance of software to support the read and write operation. In one embodiment, such software may include, but is not limited to, device drivers. Accordingly, measurement and evaluation of time for read and write operations may be applied to determine causes for delay, wherein the causes may be based upon software and/or hardware elements that support the read and write operations.

Figure 7:
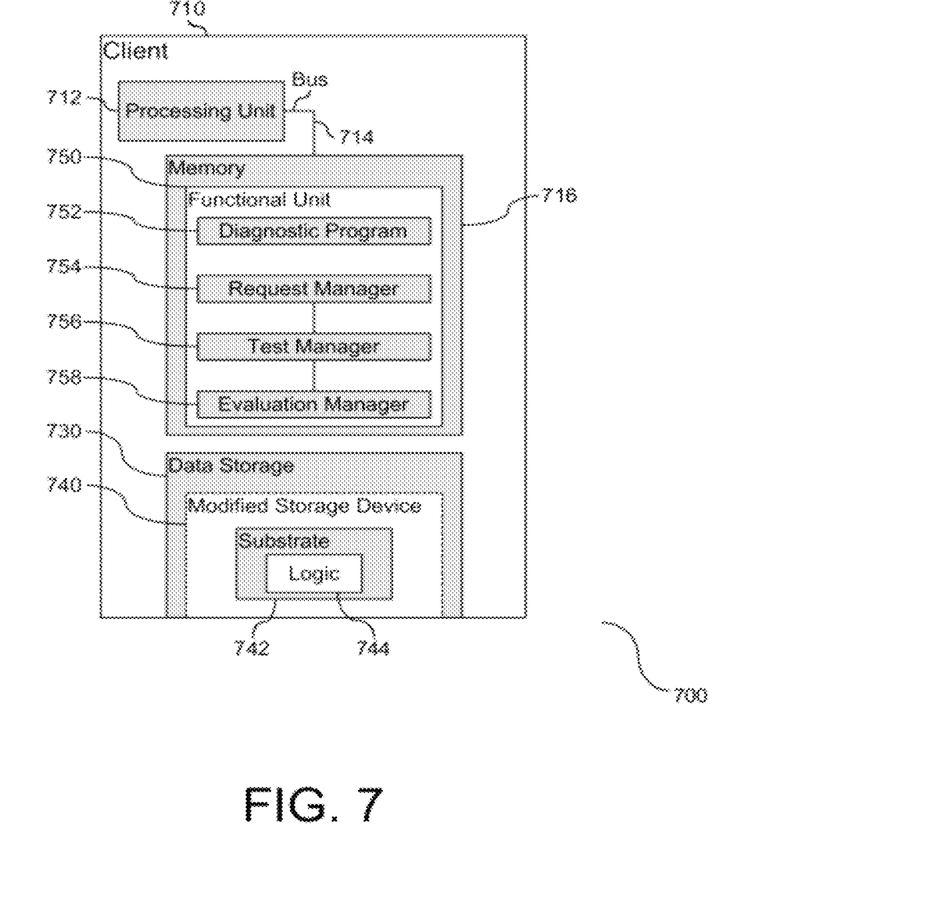
FIG. 7 is a block diagram illustrating tools embedded in a computer system to support a testing interface for diagnostic support and evaluation.

Diagnostic testing of hardware components, including performance and bandwidth testing, may take place directly between a client machine or a server and designated data storage device, or between a client machine or a server and a disk controller in communication with at least two storage devices. FIG. 7 is a block diagram (700) illustrating tools embedded in a computer system to support diagnostic testing of hardware, and more specifically for accessing performance with respect to response evaluation and/or bandwidth. For illustrating purposes, a computer system is provided with a client machine (710) in communication with data storage (730). Although the computer system illustrated a client machine (710), in one embodiment, the client machine may be replaced with a server or a personal computer. The client machine (710) is provided with hardware to support performance evaluation. As shown, client machine (710) is provided with a processing unit (712) in communication with memory (716) across a bus (714). In addition, client machine (710) is in communication with local data storage (730).

The data storage (730) is in direct communication with the client machine (710). More specifically, a slot is provided within the computer hardware of the client machine (710) to support the direct connection without use of a secondary connection element, such as a cable. The data storage (730) is replaced with a modified storage device (740). In one embodiment, data storage (730) is removed from the designated slot within the client machine (710) and replaced with the modified storage device (740). More specifically, the modified storage device is configured with a substrate (742) and logic (744) embedded within the substrate, wherein the logic (744) includes instructions to support hardware performance evaluation. The logic (740) emulates behavior of a conventional data storage device, so that the client machine views the modified storage device (740) as a conventional storage device.

A functional unit (750) is provided in communication with memory (716) to support issuance of a diagnostic request to the modified storage device (740) and evaluation of a reply communication received from the modified storage device (740). As shown, the functional unit (750) is provided with a diagnostic program (752), a request manager (754), a test manager (756), and an evaluation manager (758). The diagnostic program (752) supports issuance of a request for evaluation of the modified storage device (740). The request manager (754) communicates with the diagnostic program (752) and is responsible for sending a request from the diagnostic program (752) to the modified storage device (740). More specifically, the request manager (754) accesses and receives a response communication from the modified storage device (740); the modified storage device (740) supports the request without processing data. As noted above, the modified storage device (740) is not an actual storage device and is modified with logic to emulate a storage device. Accordingly, the modified storage device (740) is configured in communication with the request manager to receive communications and to reply to the communications without actually reading or writing data from an embedded data storage medium.

As shown, the functional unit (750) is configured with a test manager (756) in communication with the request manager (754). The test manager (756) is responsible for testing performance of supporting hardware in communication with the modified storage device (740). More specifically, the test manager (756) measures a factor in the form of a characteristic of both issuance of the request and receipt of a response communication by the request manager (754). The request manager (754) may issue a request to read data from data storage or to write data to data storage. As the modified storage device (740) does not actually include data storage, it cannot support either category of transactions. The embedded logic (744) emulates a conventional data storage device to support both categories of transactions, and to issue a reply communication to either transaction indicating receipt thereof.

An evaluation manager (758) is provided in communication with the test manager (756). The evaluation manager (758) is employed to evaluate performance of the modified storage device (740). In one embodiment, performance may be in the form of speed and/or bandwidth. With respect to speed, the evaluation manager (758) calculates the speed at which the modified storage device (740) processed a read or write request. As different computer systems may have different configurations for hardware support of data storage, the evaluation manager (758) evaluates the speed of processing the request, and not the speed at which a conventional hard drive may need to spin-up to service the request. Because the modified storage device (740) does not actually service the request, the evaluation manager (758) receives raw data pertaining to the speed at which a request may be processed based upon the physical hardware elements and connections between the functional unit (750) and the modified storage device (740). In one embodiment, the evaluation manager (758) evaluates the time interval from a send of the request to receipt of a response. Similarly, in one embodiment, the request manager (754) may send at least two requests to the modified storage device (740) in parallel, so that the evaluation manager (758) may measure the bandwidth of a channel supporting parallel process of multiple requests.

As identified above, the diagnostic program (752), request manager (754), test manager (756), and evaluation manager (758) function as elements to support the diagnostic evaluation of hardware performance and/or capacity. The diagnostic program (752) and managers (754)-(758) are shown residing in memory (716) local to the client machine (710). However, the diagnostic program (752) and managers (754)-(758) may reside as hardware tools external to memory (716), or they may be implemented as a combination of hardware and software. Similarly, in one embodiment, the diagnostic program (752) and managers (754)-(758) may be combined into a single functional item that incorporates the functionality of the separate items. As shown herein, each of the diagnostic program (752) and managers (754)-(758) are shown local to the client machine (710). However, in one embodiment they may be collectively or individually distributed across a network or multiple machines and function as a unit to evaluate hardware performance. Accordingly, the managers and director may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
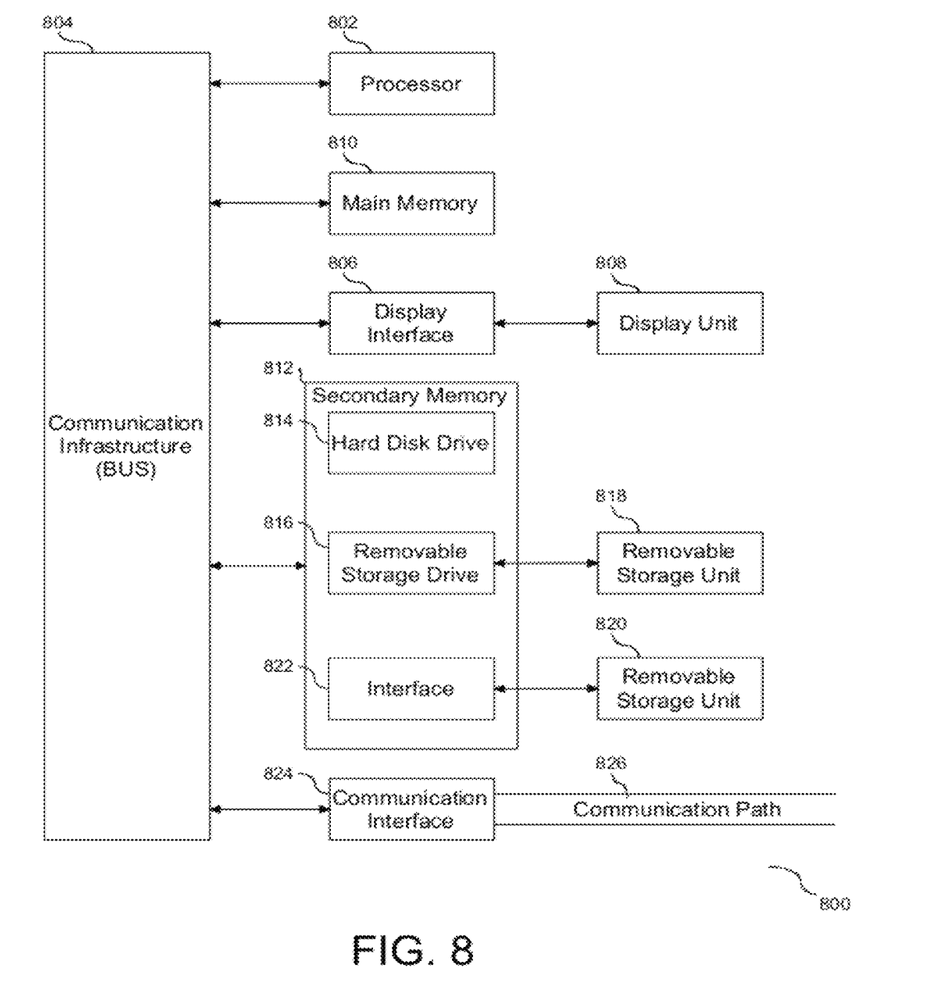
FIG. 8 is a block diagram showing a system for implementing an embodiment of the present invention.

Referring now to the block diagram of FIG. 8, additional details are now described with respect to implementing an embodiment of the present invention. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) are in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present invention as discussed herein. In particular, the computer programs, when run, enable the processor (802) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured with a modified auxiliary device with a secondary connection to the client machine. The diagnostic, together with the managers, may be employed to evaluate the performance and bandwidth of the modified auxiliary device together with the second connection. In one embodiment, the auxiliary device may be a flash drive in communication with the client machine through a universal service bus. Similarly, in one embodiment, the secondary connection may be a cable, an adapter, a fiber channel, etc., with the evaluation indicating if there are performance concerns of the hardware with respect to the secondary connection. Accordingly, the scope of protection of this invention is limited only by the following claims and their equivalents.

We claim:

1. A method comprising:
configuring a computer system with a port connection to directly receive a persistent storage device;
the port connection receiving a modified storage device, the modified device having logic to emulate behavior of the persistent device;
emulating behavior of the persistent device, including sending a request from an application to the modified device, the request to access the modified device, including the modified device to issue a response to the request with a reply after emulating a transaction, the response including a measurement of time for completion of the transaction at the modified device, wherein emulating the behavior further consists of returning a null data set for responding to a read transaction; and testing performance of supporting hardware in communication with the modified device, including measuring a factor associated with sending of the request to receipt of the response, the measuring including testing capacity of an intermediate component that supports physical communication of the request to the modified device.

2. The method of claim 1, further comprising sending the request to at least two or more modified devices in a single communication, and measuring the factor associated with sending of the request to receipt of the response.

3. The method of claim 2, wherein the factor is a measurement of bandwidth of a channel supporting the request.

4. The method of claim 1, wherein the modified storage device replaces the persistent storage device.

5. The method of claim 1, further comprising running a diagnostic measurement associated with speed and time for processing the request.

6. A system comprising:
a processing unit in communication with memory and an operating system;
a computer system with a port connection to directly receive a persistent storage device;
the port connection receiving a modified storage device, the modified device having logic to emulate behavior of the persistent device;
a functional unit in communication with the memory, the functional unit comprising:
  a diagnostic program to support issuance of an evaluation to the modified device;
  a request manager in communication with the diagnostic program, the modified device to emulate behavior of the persistent storage, including the request manager to send a request from the diagnostic program to the modified device, the request manager to access the modified device, including the modified device to issue a response to the request with a reply after emulation of a transaction, the response including a measurement of time for completion of the transaction at the modified device, wherein emulating the behavior of the persistent device consists of returning a null data set for responding to a read transaction; and
  a test manager in communication with the request manager, the test manager to test performance of supporting hardware in communication with the modified device, including measurement of a factor associated with both the sending of the request by the request manager and the receipt of the response, the measurement including to test capacity of an intermediate component that supports physical communication of the request to the modified device.

7. The system of claim 6, wherein the request includes an operation selected from the group consisting of: a read operation and a write operation.

8. The system of claim 6, further comprising the request manager to send the request to at least two or more modified devices in a single communication, and to measure the factor associated with sending of the requests to receipt of the response.

9. The system of claim 8, wherein the factor is a measurement of bandwidth of a channel supporting the request.

10. The system of claim 6, wherein the modified storage device replaces the persistent storage device.

11. A computer program product for use with an electronic communication, the computer program product comprising a computer-readable storage device having computer readable program code, which when executed on a processor causes a computer to implement a method for testing performance of computer hardware, the method comprising:
configuring a computer system with a port connection to directly receive a persistent storage device;
the port connection receiving a modified storage device, the modified device having logic to emulate behavior of the persistent device;
emulating behavior of the persistent device, including sending a request from an application to the modified device, the request to access the modified device, including the modified device to issue a response to the request with a reply after emulating a transaction, the response including a measurement of time for completion of the transaction at the modified device, wherein emulating the behavior consists of returning a null data set for responding to a read transaction; and
testing performance of supporting hardware in communication with the modified device, including measuring a factor associated with sending of the request to receipt of the response, the measuring including testing capacity of an intermediate component that supports physical communication of the request to the modified device.

12. The computer program product of claim 11, further comprising sending the request to at least two or more modified devices in a single communication, and measuring the factor associated with sending of the requests to receipt of the response.

13. The computer program product of claim 11, wherein the modified storage device replaces the persistent storage device.

14. A computer implemented method for evaluation of hardware components, the method comprising:
a computer system configured with a port connection to directly receive a persistent storage device;
the port connection to receive a modified storage device, the modified device configured with logic for emulating behavior of the persistent device, and;
the modified device emulating behavior of the persistent device, including an application sending a request to the modified device, the request accessing the modified device;
a diagnostic tool receiving a response communication from the modified device, wherein the response communication includes data acknowledging receipt of the request for emulating a transaction, and a time measurement for completion of the emulation at the modified device, wherein emulating the behavior consists of returning a null data set for responding to a read transaction; and
testing performance of supporting hardware in communication with the modified device, including measuring a factor associated with sending of the request and receipt of the response communication, the measuring including testing capacity of an intermediate component that supports physical communication of the request to the modified device.

15. The method of claim 14, wherein the modified storage device replaces the persistent storage device.

* * * * *